(12) United States Patent
Ross et al.

(10) Patent No.: US 6,637,684 B1
(45) Date of Patent: Oct. 28, 2003

(54) HAND OPERATED FOOD GRINDING APPARATUS

(75) Inventors: Gary Ross, Oxnard, CA (US); Dave C. Whitmer, Oxnard, CA (US)

(73) Assignee: Highwave Incorporated, Oxnard, CA (US)

( * ) Notice: Subject to any disclaimer, the term of this patent is extended or adjusted under 35 U.S.C. 154(b) by 0 days.

(21) Appl. No.: 10/124,983

(22) Filed: Apr. 17, 2002

(51) Int. Cl.[7] .............................................. B02C 19/08
(52) U.S. Cl. ................................. 241/169.1; 241/169.2
(58) Field of Search ........................... 241/169.1, 169.2, 241/DIG. 27

(56) References Cited

U.S. PATENT DOCUMENTS

| 4,121,775 | A | * | 10/1978 | Roseberg et al. | 241/30 |
| 4,397,425 | A | * | 8/1983 | Moore et al. | 241/169.1 |
| 4,582,265 | A | * | 4/1986 | Petronelli | 241/95 |
| 4,765,549 | A | * | 8/1988 | Sherman | 241/169 |
| 5,322,227 | A | * | 6/1994 | Fiocchi | 241/100 |
| 5,618,004 | A | * | 4/1997 | Klearman et al. | 241/21 |
| 5,730,372 | A | * | 3/1998 | Bradley | 241/29 |
| 6,209,439 | B1 | * | 4/2001 | Repac et al. | 83/858 |

* cited by examiner

Primary Examiner—Mark Rosenbaum

(74) Attorney, Agent, or Firm—Thomas I. Rozsa; Tony D. Chen

(57) ABSTRACT

The present invention is hand operated food grinding apparatus into which is designed a series of opposing parallel ridges to enable the food item such as garlic, peppercorn, spices, coffee etc. to be ground into coarsely ground portions or finely ground portions depending on the arrangement and design of the opposing parallel ridges. The hand grinding apparatus has a base having an upper surface made of a series of parallel ridges separated by parallel groves wherein each of the parallel ridges has a flat upper surface, and also comprises a top member having a lower surface made of an opposing series of parallel ridges separated by parallel grooves wherein each of the parallel ridges has a surface, and wherein a respective ridge of the base member is aligned with a respective ridge of a top member or a respective ridge of a base member is offset from a respective ridge or a top member. In an alternative embodiment of the present invention, a hand grinding apparatus has a first base member having an upper surface made of a series of parallel ridges which are rounded in a concave fashion to be rounded into the base and are separated by a series of parallel concave grooves, wherein each of the parallel concave ridges has a rounded or flat surface, and also has a second top member having a lower surface made of a series of parallel convex ridges separated by parallel convex grooves, wherein each of the parallel convex ridges has a rounded or flat surface, and wherein each of the convex parallel ridges of the top member is aligned with each of the concave parallel grooves of the base member or offset therefrom.

20 Claims, 3 Drawing Sheets

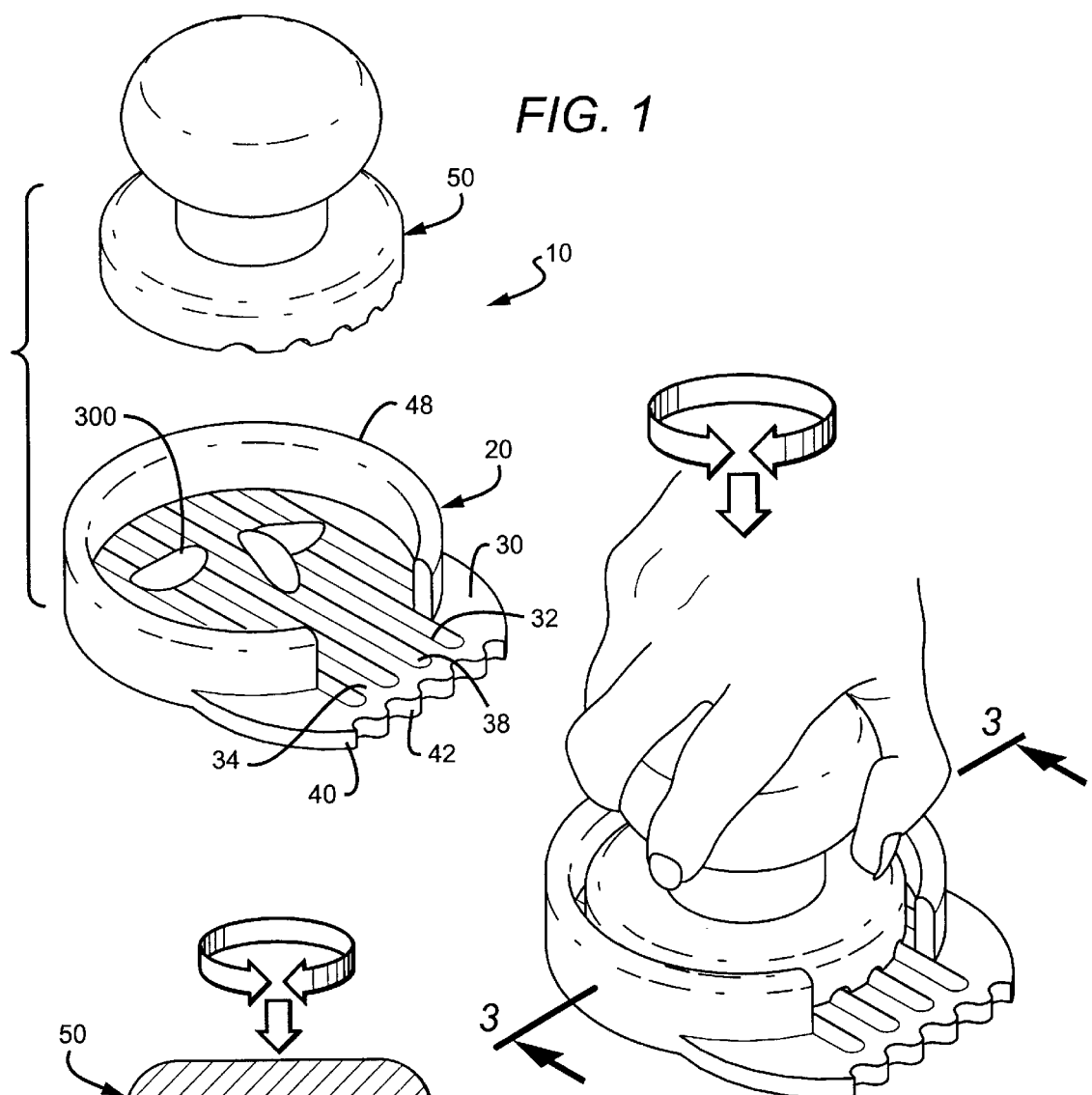
FIG. 1
FIG. 2
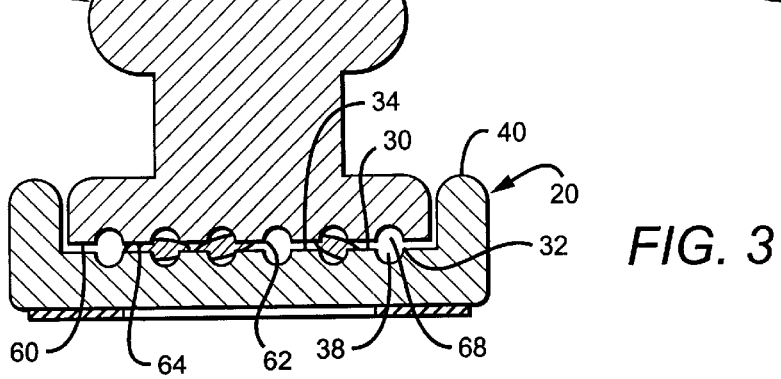
FIG. 3

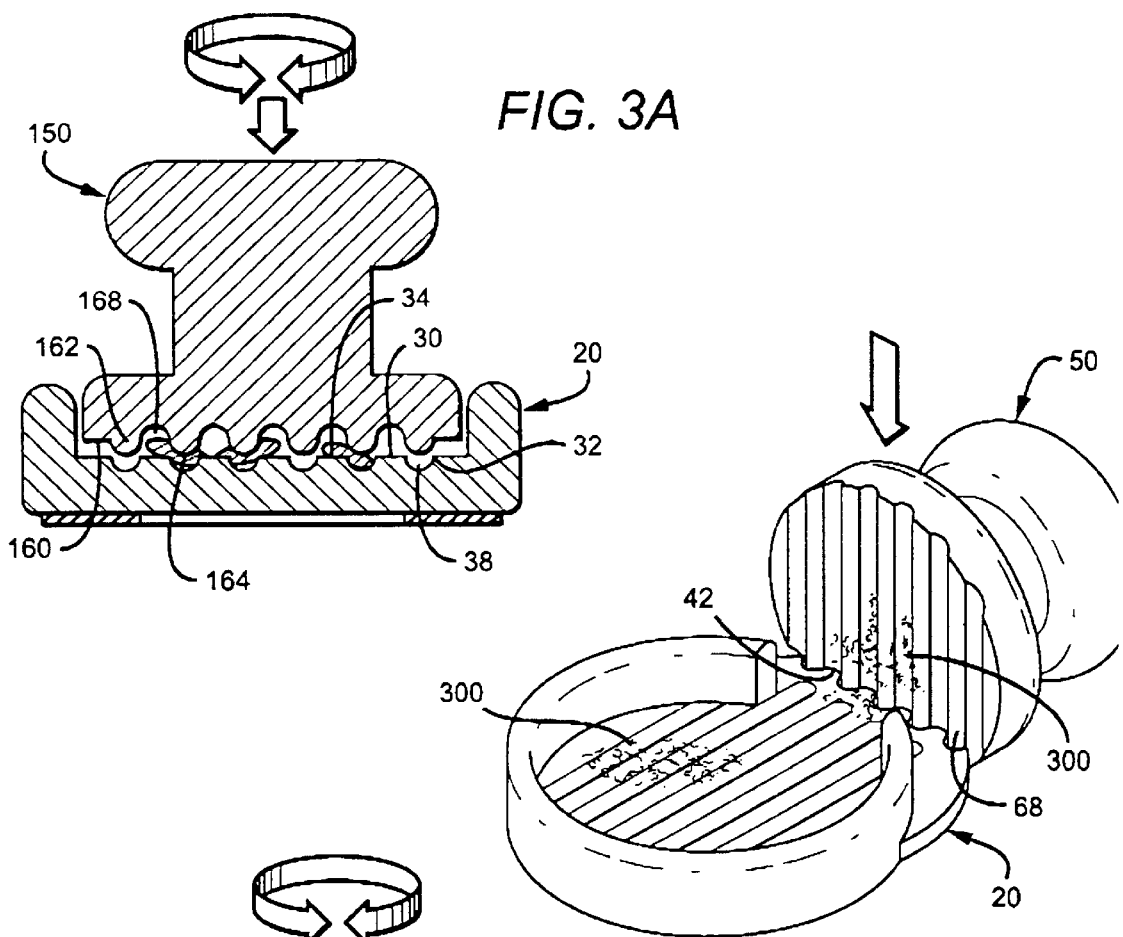
FIG. 3A
FIG. 4
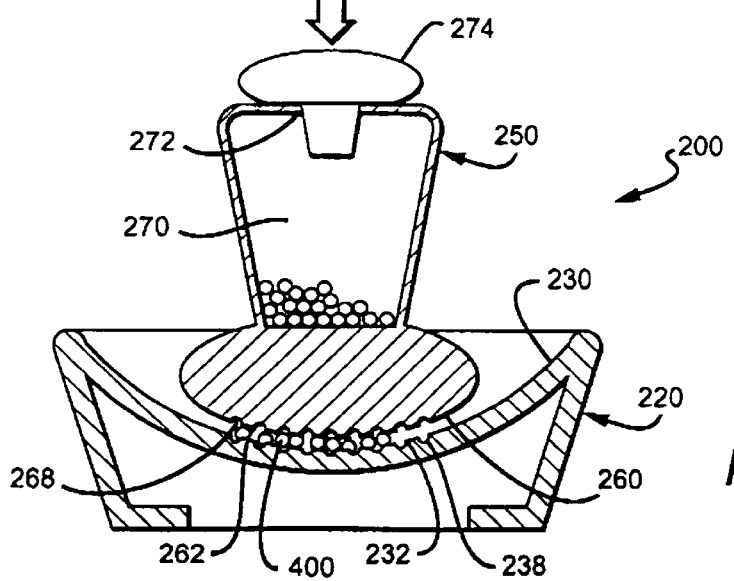
FIG. 7

HAND OPERATED FOOD GRINDING APPARATUS

BACKGROUND OF THE INVENTION

1. Field of the Invention

The present invention relates to the general field of food preparation items. In particular, the field of the present invention relates to food grinding apparatus operated by hand, as opposed to electric or other motorized apparatus.

2. Description of the Prior Art

In general, prior art food grinding apparatus which is used to grind foods such as garlic or peppercorns are generally smooth surface devices wherein pressure is applied between the surfaces to grind the foods. A common food grinding apparatus known in the prior art is a mortar and pestle which preparers of Latin foods use to prepare sauces and salsas.

It has been discovered that the operation of two smooth surfaces grinding against each other such as a mortar and pestle do not provide a finely ground or chopped or minced food item. There is a significant need to provide a hand operated food grinding apparatus which can enable the user to finely grind and mince food items.

SUMMARY OF THE INVENTION

The present invention is hand operated food grinding apparatus into which is designed a series of opposing parallel ridges to enable the food item such as garlic, peppercorn, spices, coffee etc. to be ground into coarsely ground portions or finely ground portions depending on the arrangement and design of the opposing parallel ridges.

It has been discovered, according to the present invention, that if the hand grinding apparatus comprises a base having an upper surface made of a series of parallel ridges separated by parallel groves wherein each of the parallel ridges has a flat upper surface, and also comprises a top member having a lower surface made of an opposing series of parallel ridges separated by parallel grooves wherein each of the parallel ridges has a flat surface, and wherein a respective ridge of the base member is aligned with a respective ridge of a top member, then the hand held member can be used to coarsely grind garlic because some of the garlic falls into the grooves of the base and top members and can be removed therefrom.

It has also been discovered, according to the present invention, that if the hand grinding apparatus comprises a base having an upper surface made of a series of parallel ridges separated by parallel groves wherein each of the parallel ridges has a flat upper surface, and also comprises a top member having a lower surface made of an opposing series of parallel ridges separated by parallel grooves wherein each of the parallel ridges has a flat lower surface, wherein a respective ridge of the base member is offset from a respective ridge of a top member such that the ridges of the top member are aligned with the grooves of the base member, then the handheld member can be used to finely grind garlic because the ridges of the top member will be aligned with the grooves of the base member so that garlic will be ground even if it falls into the grooves of the base and top members.

It has additionally been discovered, according to the present invention, that if a hand grinding apparatus comprises abase having an upper surface made of a series of parallel ridges separated by parallel grooves wherein each of the parallel ridges has a flat upper surface, and also comprises a top member having a lower surface made of a series of parallel ridges separated by parallel grooves, wherein each of the parallel ridges has a rounded semicircular surface wherein a respective ridge of the base member is aligned with a respective ridge of a top member, then the handheld member can be used to finely grind garlic because some of the garlic falls into the grooves of the top and the grooves of the lower member and can be removed therefrom.

It has additionally been discovered, according to the present invention, that if a hand grinding apparatus comprises a base having an upper surface made of a series of parallel ridges separated by parallel grooves wherein each of the parallel ridges has a flat upper surface, and also comprises a top member having a lower surface made of a series of parallel ridges separated by parallel grooves, wherein each of the parallel ridges has a rounded semicircular surface wherein a respective ridge of the base member is offset from a respective ridge of a top member, such that a rounded ridge of a top member is aligned with a groove of the base member, then the handheld member can be used to finely grind garlic because some of the garlic falls into the grooves of the base and top members and the offset rounded ridges of the top member can be used to grind the garlic even when it falls into the grooves of the base member to create a more finely ground garlic.

It has also been discovered, according to an alternative embodiment of the present inventions that if a hand grinding apparatus comprises a first base member having an upper surface made of a series of parallel ridges which are rounded in a concave fashion to be rounded into the base and are separated by a series of parallel concave grooves, wherein each of the parallel concave ridges has a rounded or flat surface, and also comprises a second top member having a lower surface made of a series of parallel convex ridges separated by parallel convex grooves, wherein each of the parallel convex ridges has a rounded or flat surface, and wherein each of the convex parallel ridges of the top member is aligned with each of the concave parallel grooves of the base member, then the handheld member can be used to coarsely grind peppercorns, coffee, seeds and other food items which are smaller and more delicate than garlic.

It has also been discovered, according to an alternative embodiment of the present invention, that if a hand grinding apparatus comprises a first base member having an upper surface made of a series of parallel ridges which are rounded in a concave fashion to be rounded into the base and are separated by a series of parallel concave grooves, wherein each of the parallel concave ridges has a rounded or flat surface, and also comprises a second top member having a lower surface made of a series of parallel convex ridges separated by parallel convex grooves, wherein each of the parallel convex ridges has a rounded or flat surface, and wherein each of the convex parallel ridges of the top member is offset from each of the concave parallel ridges of the base member, so that a respective convex parallel ridge of the top member is aligned with a concave groove of the base member, then the handheld member can be used to finely grind peppercorns, coffee, seeds and other food items which are smaller and more delicate than garlic.

It is therefore an object of the present invention to provide a hand grinding apparatus which enables food items such as garlic to be coarsely ground by having a base member having a series of parallel ridges separated by parallel grooves wherein each of the surfaces of the parallel ridges is flat and having a top member having an opposing lower surface having a series of parallel ridges separated by parallel grooves wherein each of the parallel ridges has a flat surface.

It is also an object of the present invention to provide an alternative embodiment wherein food items can be more finely ground by having the series of parallel flat surfaced ridges of the top surface aligned with the parallel grooves of the lower surface so that the parallel ridges can intersect into and grind food when it falls into the grooves of the lower base surface.

It is also an object of the present invention to provide a further alternative embodiment wherein food can be even more finely coarsely ground by having the ridges of the top surface formed in a rounded manner so that they can more conveniently be pressed into the grooves of the base member so that the rounded ridges of the top member are aligned with the grooves of the base member to more finely crush and grind food.

It is also an object of the present invention to provide a hand operated grinding apparatus to grind more fine foods such as coffee, spices, seeds, etc. by having a base member comprised of a series of concave ridges separated by concave grooves and having a top member having an opposing surface comprising a series of convex ridges separated by convex grooves so that the convex ridges of the top surface are aligned with the concave ridges of the base member to more finely crush foods.

It is also an object of the present invention to provide an alternative embodiment wherein the convex ridges of the top member are offset from the concave ridges of the base member so that the convex ridges of the top member are aligned with the concave grooves of the base member so that food items which fall into the grooves of the base member can be more finely ground by the convex ridges of the top member.

It is also an object of the present invention to provide an opposing convex and concave grinding surfaces where at least one of the surfaces are rounded to make for more precision grinding.

It is also an object of the present invention to provide a set of opposing concave and convex grinding ridges wherein both ridges are flat so that food can be more coarsely ground.

It is also an object of the present invention to have a set of opposing concave and convex grinding surfaces where the ridges are aligned with each other and it is also an object of the present invention to have a series of opposing concave and convex grinding surfaces where the ridges are offset from one another so that a series of ridges in the top member are aligned with the grooves of the base member to provide more fine grinding.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is an exploded view of a first embodiment of the present invention showing the first base member separated from the second top member;

FIG. 2 is a perspective operational view of the first embodiment of the present invention;

FIG. 3 is a cross-sectional view taken along line 3—3 of FIG. 2;

FIG. 3A is a cross-sectional operational view of an alternative embodiment of the first embodiment of the present invention;

FIG. 4 is a perspective view of a scraping action of the first embodiment of the present invention;

FIG. 7 is a cross-sectional view taken along line 7—7 of FIG. 6.

DETAILED DESCRIPTION OF THE PREFERRED EMBODIMENTS

Figure 5:
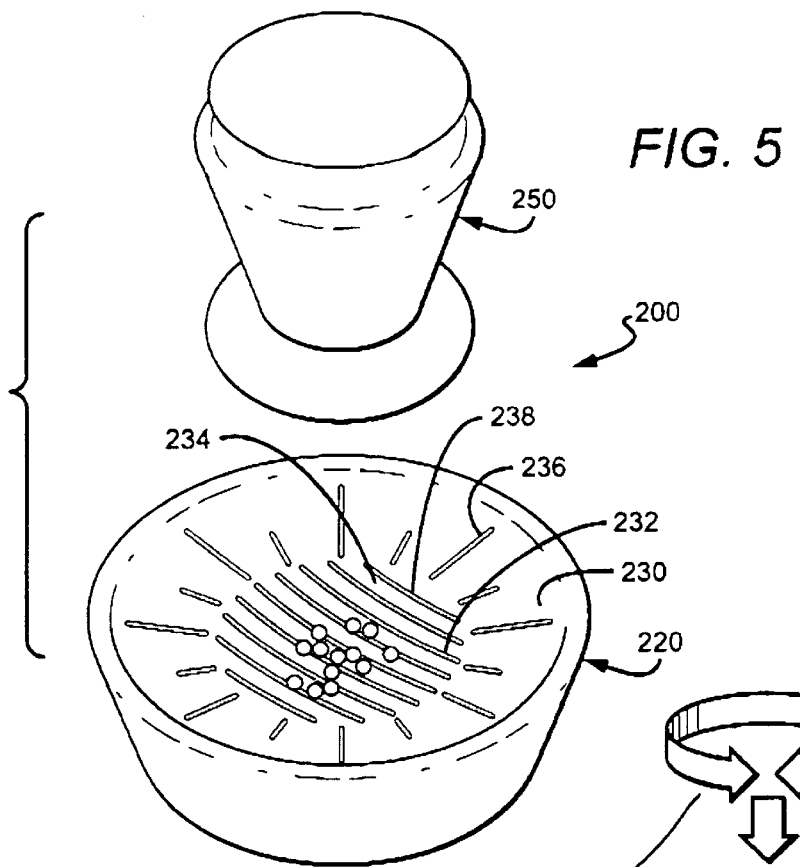
FIG. 5 is an exploded view of a second embodiment of the present invention showing the first base member separated from the second top member.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 3, there is illustrated the first embodiment 10 of the present invention hand operated food grinding apparatus. The first embodiment comprises a first base member 20 and a second top member 50. The base member 20 comprises an upper surface 30 having a series of parallel ridges 32 separated by a series of parallel grooves 38. In this first embodiment, each of the parallel ridges 32 has a flat upper surface 34. The first upper grinding surface 30 terminates in a first cutting surface 40 having a multiplicity of serrations or teeth 42. The series of parallel ridges 32 and parallel grooves 38 are partially surrounded by a vertical wall 48. The vertical wall 48 enables food items to be retained within the first base member 20.

The first embodiment of the present invention hand operated food grinding apparatus also has a second top member 50 having a lower grinding surface 60. The lower grinding surface 60 of top member 50 also has a series of parallel ridges 62 separated by a series of parallel grooves 68. In this first embodiment, each of the parallel ridges 62 has a flat lower surface 64. In this first embodiment, each flat lower surface 64 of each parallel ridge 62 of top member 50 is respectively aligned with each flat upper surface 34 of each parallel ridge 32 of base member 20, as illustrated in the cross-sectional view of FIG. 3. In operation, a food item which by way of example may be garlic 300 is crushed between the lower surface 60 of top member 50 and the upper surface 30 of base member 20 as illustrated in FIG. 2. The series of corresponding parallel ridges 32 and 62 enable the food item which by way of example, is garlic, to be crushed between the series of parallel ridges such that some of the food item 300 falls into grooves 38 of base member 30 or is trapped within grooves 68 of top member 50.

Through the present invention, the array of parallel grooves placed against a second array of similar grooves is used to create a unique grinding process. With the force applied against the two surfaces, the action cuts, pinches and crushes. When using two parallel groove arrays facing each other as illustrated in FIG. 2 and applying an oscillating or back and forth motion, the food item 300 gets smashed into the grooves and a scissoring action takes place. By the action of the parallel grooves moving against each other, the food item is always being cut at different cutting angles and as a result, can be coarsely ground through the present invention.

Referring to FIG. 4, after the grinding action has been completed, some of the ground food items 300 are in the grooves 68 of top member 50. The lower surface 60 of top member 50 is then aligned with the teeth 42 on the, base member 20 so that the food item 300 is scraped out of the grooves 68 through use of the teeth 42 being respectively aligned with grooves 68. A utensil such as a spoon, fork or even fingers can be used to scrape the food item 300 out of the grooves 38 of base member 20.

While one embodiment of the first embodiment of the present invention is to have the flat surfaces 64 of ridge members 62 aligned with the flat surfaces 34 of ridge members 32, it will be appreciated that it is also within the spirit and scope of the present invention to have the ridges 62 of top member 50 offset from the ridges 32 of base member 20 so that a respective flat surfaced ridge 62 is aligned with a groove 38 in base member 20. By having this offset arrangement, it has been found that more precise and accurate cutting can be achieved.

An alternative embodiment of the first embodiment of the present invention is illustrated in FIG. 3A. In this alternative embodiment, the base member 20 is the same as is illustrated in FIG. 1. However, the top member is modified in two ways. First, lower surface 160 of top member 150 has a series of parallel ridges 162 separated by parallel grooves 168 but in this case, instead of having a flat lower surface as illustrated in FIG. 3, the series of parallel ridges 162 has a rounded lower surface 164 and each of the rounded surfaces is instead aligned with a respective groove 38. It has been discovered that by having the rounded lower surface, the amount of the cutting action can be more precise and by having the rounded surfaced ridges 162 of top member 160 aligned with the respective grooves 38 of the upper surface 30 of base member 20, more precise cutting can be achieved so that the garlic 300 is ground in a much more fine manner. By having the ridges 162 aligned with grooves 38, it serves to force the minced garlic out of the groove 38 to some extent. This is desirable if the user wants a more finely minced garlic and with this embodiment, it will be easier to produce more finely minced garlic. Once again, the embodiment illustrated in FIG. 4 can be utilized with this alternative embodiment illustrated in FIG. 3A in that food items such as minced garlic which has now been embedded in the grooves 168 of top member 150 can be scraped out by use of the teeth 42 respectively aligned with a respective groove 168. Furthermore, food can also be removed from the base member as previously discussed by having a utensil such as a spoon or fork scrape the food out of the base member or alternatively using fingers to scrape the minced food item 300 out of the base member.

Further, it will be appreciated that although the preferred embodiment of the alternative embodiment is to have the rounded ridges 162 aligned with grooves 38, it is also within the spirit and scope of the present invention to have the rounded ridges 162 respectively aligned with flat ridges 32 of base member 20. While this action will not present as fine a cutting force as the alternative embodiment illustrated in FIG. 3A, it is also within the spirit and scope of the present invention to include this additional embodiment.

Therefore, the first embodiment of the present invention has as its preferred embodiment a base having an upper grinding surface 30 which has ridges 32 offset by parallel grooves 38 and in the preferred embodiment, the ridges have flat surfaces 34. While it is within the spirit and scope of the present invention to also have rounded surfaces 34, that does not provide as effective a grinding surface as the flat surfaces 34 in the base member.

Further, the present invention incorporates the concept of having an opposing mating surface on the lower surface of top member 50 having a series of ridges 62 which can either be aligned with ridges 32 of the base member or offset from ridges 32 of the base member so that the ridges 62 are aligned with grooves 38. The lower surface of ridges 62 can either be flat 64 as illustrated in FIG. 3 or alternatively, can have rounded surfaces 164 as illustrated in FIG. 3A. Therefore, the concept of the present invention is to have a mating top member having a lower surface having a series of parallel ridges separated by parallel grooves wherein the parallel ridges can either have a flat surface or have a rounded surface and where the parallel ridges 62 or 162 can either be aligned with ridges 32 in base member 20 or offset from ridges 32 in base member 20 so that the ridges in the top member are aligned with the grooves 38 in base member 20.

All four of these embodiments are within the spirit and scope of the present invention to provide an effective scissoring and cutting operation so that food items such as garlic can be appropriately minced in the present invention. The wall 48 serves to retain the food item 300 within the base member 20 during the grinding process as illustrated in FIG. 2. While the grinding process in FIG. 2 shows a rotational motion since the overall wall 48 forms a partial circle, it will be appreciated that there is also a sufficient space between the top member 50 and the wall 48 of base member 20 so that there can also be a side to side and back and forth grinding action to further serve to mince the food item 300. Any of the, embodiments discussed above wherein the lower surface of top member 50 has ridges that are aligned with the ridges of the base member or offset and aligned with the grooves of the base member and have either flat ridges or rounded ridges are all within the spirit and scope of the present invention to be used in the grinding operation as illustrated in FIG. 2.

Figure 6:
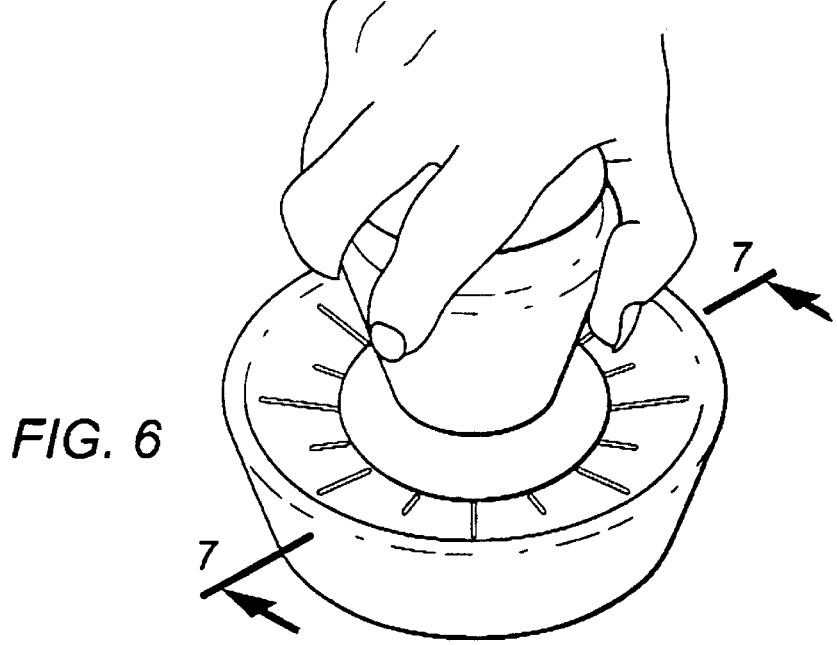
FIG. 6 is a perspective operational view of the second embodiment of the present invention.

Referring to FIGS. 5 through 7, there is illustrated a second embodiment 200 of the present invention hand operated food grinding apparatus.

The second embodiment 200 comprises a first base member 220 having an upper grinding surface 230. Formed into upper grinding surface 230 are a series of parallel ridges 232 which are rounded in a concave fashion to be rounded into surface 230 of base 220. The series of parallel concave ridges 232 are separated by a series of parallel concave grooves 238 as illustrated in FIG. 5. In the preferred embodiment illustrated in FIGS. 5 through 7, each of the concave ridges 232 has a flat top surface 234. In an alternative embodiment, each of the concave ridges 232 can have a rounded top surface.

An optional feature of the present invention is a multiplicity of radially extending grooves 236 on upper surface 230 of base member 220 as illustrated in FIG. 5. The optional radially extending grooves 236 can be formed as long grooves or short grooves as illustrated in FIG. 5 and have alternative long and short grooves to provide an esthetic appearance as illustrated in FIG. 5.

The second embodiment 200 of the present invention hand operated food grinding apparatus also has a second top member 250 having a lower grinding surface 260. The lower grinding surface 260 of top member 250 also has a series of parallel convex ridges 262 separated by a series of parallel convex grooves 268. In the preferred embodiment as illustrated in FIG. 7, each of the parallel convex ridges 262 has a flat lower surface 264. It is also within the spirit and scope of the present invention to have each of the parallel convex ridges 262 formed with a rounded lower surface.

In the second embodiment 200, there is substantially more interior space for the top member 250 to move within base 220 so the convex ridges 262 can either be aligned with convex ridges 232 or offset from convex ridges 232 and aligned with convex grooves 238.

The second embodiment of the present invention as illustrated in FIGS. 5 through 7 is designed to grind smaller items such as peppercorns, seeds, spices, coffee etc. Illustrated in FIG. 7 is a series of peppercorns 400 which are ground between the convex ridges 262 of lower surface 260 of top 250 and the concave ridges 232 formed in upper surface 230 of base 220. Regardless of the embodiment whether the ridges 262 and 232 contain flat surfaces as illustrated in FIG. 7 or possibly even rounded surfaces, through the present invention, the array of parallel convex ridges placed against a second array of matching concave ridges is used to create a unique grinding process. With the force applied against the two surfaces, the action cuts, pinches and crushes. The operation is illustrated in FIG. 6 and when illustrated in FIG. 6, shows a rotational motion of the top 250 against the base 220 so that surfaces 260 and 230 are adjacent one another to crush the peppercorns between their respective ridges so that the peppercorns 400 fall into the respective grooves 238 of the base 220 and 268 of the top 250. Some of the peppercorns may also fall into the optional radial grooves 236. When using the rotational motion as illustrated in FIG. 6 or alternatively, a back and forth motion, the food item 400 gets smashed into the grooves and a scissoring action takes place. By the action of the matching concave and convex parallel ridges moving against each other, the food item 400 is always being cut at different angles and as a result, can be coarsely ground or finely ground through the present invention.

An additional alternative feature of the second embodiment is to have a hollow upper section 270 of top 250 so that peppercorns can be placed therein through opening 272 and sealed with a closing member 274. This is obviously an optional feature, so that peppercorns can be stored within the hollow top.

Therefore, the concept of the second embodiment of the present invention is to have a series of matching concave and convex parallel ridges on opposing surfaces so that smaller finer items can be ground and minced in the manner as previously discussed. In the preferred embodiment, the top 260 has parallel convex ridges separated by parallel convex grooves and the bottom has parallel concave ridges separated by parallel concave grooves so that the respective ridges can either be aligned with each other or aligned with respective grooves. Alternatively, it is within the spirit and scope of the present invention although not the preferred embodiment to have concave ridges and concave grooves in the lower surface of the top member and convex grooves and convex ridges in the upper surface of the base member. The concept is still the same to have opposing sets of parallel ridges and parallel grooves so that the fine small items such as peppercorns, seeds, spices and coffee can be appropriately ground.

After the grinding process has been completed, the base can be turned upside down to cause the ground food item 400 to fall into the mixing bowl or other area where the spices are desired and the top can be shaken so that the finely ground items which are not as adhesive as garlic can fall out of the top. If necessary, a utensil such as a spoon or fork can be used to dislodge any food items which have become imbedded in either grooves 238 or 268.

Therefore, through use of the second embodiment of the present invention, opposing concave and convex ridges enable a food item to be very precisely ground to any desired level of grinding and fineness.

The present invention embodiments can be made out of any desired material. By way of example only, the first embodiment illustrated in FIGS. 1 through 4 can be made out of porcelain or any other ceramic material although it is also within the spirit and scope of the present invention to include any other designs such as metal or wood. However, since wood has a tendency to retain the smell of garlic and metal may also have a tendency to retain the smell of garlic, the preference is to have the first embodiment illustrated in FIGS. 1 through 4 made out of ceramic material such as porcelain. Similarly, the second embodiment illustrated in FIGS. 5 through 7 can also be made out of ceramic material such as porcelain but since the spices and seeds and coffee are less likely to have their smell retained, the items can also be made out of wood, metal, plastic etc.

The invention is not limited to any size, as any size and diameter are within the spirit and scope of the present invention.

Defined in detail, the present invention is a hand operated food grinding apparatus comprising: (a) a base member having an upper surface made of a series of parallel ridges separated by a series of parallel grooves wherein each of the parallel ridges has a flat upper surface; (b) the base member having a wall on the upper surface to provide a barrier for food items placed on the upper surface; (c) a top member having a lower surface made of a series of parallel ridges separated by parallel grooves wherein each of the parallel ridges has a flat lower surface; (d) the top designed to fit within the base so that the lower surface of the top member abuts against the upper surface of the base member so that any food item placed within the base member is compressed and ground by a grinding action between the top member and the base member; and (e) each respective ridge of the base member is aligned with a respective ridge of a top member so that any food item placed between the lower surface of the top member and the upper surface of the base member can be coarsely ground.

Also defined in detail, the present invention is a hand operated food grinding apparatus comprising: (a) a base member having an upper surface made of a series of parallel ridges separated by a series of parallel grooves wherein each of the parallel ridges has a flat upper surface; (b) the base member having a wall on the upper surface to provide a barrier for food items placed on the upper surface; (c) a top member having a lower surface made of a series of parallel ridges separated by parallel grooves wherein each of the parallel ridges has a flat lower surface; (d) the top designed to fit within the base so that the lower surface of the top member abuts against the upper surface of the base member so that any food item placed within the base member is compressed and ground by a grinding action between the top member and the base member; and (e) each respective ridge of the base member is offset from a respective ridge of a top member such that the ridges of the top member are respectively aligned with the grooves of the base member so that any food item placed between the top member and the base member can be finely ground.

Also defined in detail, the present invention hand operated food grinding apparatus comprising: (a) a base member having an upper surface made of a series of parallel ridges separated by a series of parallel grooves wherein each of the parallel ridges has a flat upper surface; (b) the base member having a wall on the upper surface to provide a barrier for food items placed on the upper surface; (c) a top member having a lower surface made of a series of parallel ridges separated by parallel grooves wherein each of the parallel ridges has a rounded lower surface; (d) the top designed to fit within the base so that the lower surface of the top member abuts against the upper surface of the base member so that any food item placed within the base member is compressed and ground by a grinding action between the top member and the base member; and (e) each respective ridge of the base member is aligned with a respective ridge of a top member so that any food item placed between the lower surface of the top member and the upper surface of the base member can be coarsely ground.

Also defined in detail, the present invention is a hand operated food grinding apparatus comprising: (a) a base member having an upper surface made of a series of parallel ridges separated by a series of parallel grooves wherein each of the parallel ridges has a flat upper surface; (b) the base member having a wall on the upper surface to provide a barrier for food items placed on the upper surface; (c) a top member having a lower surface made of a series of parallel ridges separated by parallel grooves wherein each of the parallel ridges has a rounded lower surface; (d) the top designed to fit within the base so that the lower surface of the top member abuts against the upper surface of the base member so that any food item placed within the base member is compressed and ground by a grinding action between the top member and the base member; and (e) each respective ridge of the base member is offset from a respective ridge of a top member such that the ridges of the top member are respectively aligned with the grooves of the base member so that any food item placed between the top member and the base member can be finely ground.

Defined more broadly, the present invention is a hand operated food grinding apparatus comprising: (a) a base member having an upper surface made of a series of parallel ridges separated by a series of parallel grooves wherein each of the parallel ridges has an upper surface; (b) a top member having a lower surface made of a series of parallel ridges separated by parallel grooves wherein each of the parallel ridges has a lower surface; (c) the top designed to fit within the base so that the lower surface of the top member abuts against the upper surface of the base member so that any food item placed within the base member is compressed and ground by a grinding action between the top member and the base member; and (d) each respective ridge of the base member is aligned with a respective ridge of a top member so that any food item placed between the lower surface of the top member and the upper surface of the base member can be coarsely ground.

Also defined more broadly, the present invention is a hand operated food grinding apparatus comprising: (a) a base member having an upper surface made of a series of parallel ridges separated by a series of parallel grooves wherein each of the parallel ridges has an upper surface; (b) a top member having a lower surface made of a series of parallel ridges separated by parallel grooves wherein each of the parallel ridges has a lower surface; (c) the top designed to fit within the base so that the lower surface of the top member abuts against the upper surface of the base member so that any food item placed within the base member is compressed and ground by a grinding action between the top member and the base member; and (d) each respective ridge of the base member is offset from a respective ridge of a top member such that the ridges of the top member are respectively aligned with the grooves of the base member so that any food item placed between the top member and the base member can be finely ground.

Also defined more broadly, the present invention is a hand operated food grinding apparatus comprising: (a) a base member having an upper surface made of a series of parallel ridges separated by a series of parallel grooves wherein each of the parallel ridges has an upper surface; (b) a top member having a lower surface made of a series of parallel ridges separated by parallel grooves wherein each of the parallel ridges has a lower surface; (c) the top designed to fit within the base so that the lower surface of the top member abuts against the upper surface of the base member so that any food item placed within the base member is compressed and ground by a grinding action between the top member and the base member; and (d) each respective ridge of the base member is aligned with a respective ridge of a top member so that any food item placed between the lower surface of the top member and the upper surface of the base member can be coarsely ground.

Defined more broadly, the present invention is a hand operated food grinding apparatus comprising: (a) a base member having an upper surface made of a series of parallel ridges separated by a series of parallel grooves wherein each of the parallel ridges has an upper surface; (b) a top member having a lower surface made of a series of parallel ridges separated by parallel grooves wherein each of the parallel ridges has a lower surface; (c) the top designed to fit within the base so that the lower surface of the top member abuts against the upper surface of the base member so that any food item placed within the base member is compressed and ground by a grinding action between the top member and the base member; and (d) each respective ridge of the base member is offset from a respective ridge of a top member such that the ridges of the top member are respectively aligned with the grooves of the base member so that any food item placed between the top member and the base member can be finely ground.

The present invention is also defined as a hand operated food grinding apparatus comprising: (a) a base member having an upper surface made of a series of parallel ridges which are rounded in a concave fashion to be rounded into the base and are separated by a series of parallel concave grooves, wherein each of the parallel concave ridges has a flat surface; and (b) a top member having a lower surface made of a series of parallel convex ridges separated by parallel convex grooves, wherein each of the parallel convex ridges has a flat surface, there being sufficient space along the upper surface of the base member to permit the convex ridges of the top to be either aligned with the concave ridges of the base or to permit the convex ridges of the top to be aligned with the concave grooves of the base; (c) whereby food items placed between the concave ridges of the base and the convex ridges of the top can be finely ground.

The present invention is also defined as a hand operated food grinding apparatus comprising: (a) a base member having an upper surface made of a series of parallel ridges which are rounded in a concave fashion to be rounded into the base and are separated by a series of parallel concave grooves, wherein each of the parallel concave ridges has a flat surface; and (b) a top member having a lower rounded surface made of a series of parallel convex ridges separated by parallel convex grooves, wherein each of the parallel convex ridges has a rounded surface, there being sufficient space along the upper surface of the base member to permit the convex ridges of the top to be either aligned with the concave ridges of the base or to permit the convex ridges of the top to be aligned with the concave grooves of the base; (c) whereby food items placed between the concave ridges of the base and the convex ridges of the top can be finely ground.

The present invention is also defined more broadly as a hand operated food grinding apparatus comprising: (a) a base member having an upper surface made of a series of parallel ridges which are rounded In a concave fashion to be rounded into the base and are separated by a series of parallel concave grooves, wherein each of the parallel concave ridges has a grinding surface; and (b) a top member having a lower surface made of a series of parallel convex ridges separated by parallel convex grooves, wherein each of the parallel convex ridges has a grinding surface, there being sufficient space along the upper surface of the base member to permit the convex ridges of the top to be either aligned with the concave ridges of the base or to permit the convex ridges of the top to be aligned with the concave grooves of the base; (c) whereby food items placed between the concave ridges of the base and the convex ridges of the top can be finely ground.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A hand operated food grinding apparatus comprising:
   a. a base member having an upper surface made of a series of parallel ridges separated by a series of parallel grooves wherein each of the parallel ridges has a flat upper surface;
   b. said base member having a wall on said upper surface to provide a barrier for food items placed on said upper surface;
   c. a top member having a lower surface made of a series of parallel ridges separated by parallel grooves wherein each of the parallel ridges has a flat lower surface;
   d. said top designed to fit within said base so that the lower surface of said top member abuts against the upper surface of said base member so that any food item placed within said base member is compressed and ground by a grinding action between the top member and the base member; and
   e. each respective ridge of the base member is aligned with a respective ridge of a top member so that any food item placed between the lower surface of the top member and the upper surface of the base member can be coarsely ground.

2. A hand operated food grinding apparatus as defined in claim 1 further comprising a series of teeth on a portion of said base member.

3. A hand operated food grinding apparatus as defined in claim 1 wherein said wall has an opening to permit food to be slid off the base.

4. A hand operated food grinding apparatus comprising:
   a. a base member having an upper surface made of a series of parallel ridges separated by a series of parallel grooves wherein each of the parallel ridges has a flat upper surface;
   b. said base member having a wall on said upper surface to provide a barrier for food items placed on said upper surface;
   c. a top member having a lower surface made of a series of parallel ridges separated by parallel grooves wherein each of the parallel ridges has a flat lower surface;
   d. said top designed to fit within said base so that the lower surface of said top member abuts against the upper surface of said base member so that any food item placed within said base member is compressed and ground by a grinding action between the top member and the base member; and
   e. each respective ridge of the base member is offset from a respective ridge of a top member such that the ridges of the top member are respectively aligned with the grooves of the base member so that any food item placed between the top member and the base member can be finely ground.

5. A hand operated food grinding apparatus as defined in claim 4 further comprising a series of teeth on a portion of said base member.

6. A hand operated food grinding apparatus as defined in claim 4 wherein said wall has an opening to permit food to be slid off the base.

7. A hand operated food grinding apparatus comprising:
   a. a base member having an upper surface made of a series of parallel ridges separated by a series of parallel grooves wherein each of the parallel ridges has a flat upper surface;
   b. said base member having a wall on said upper surface to provide a barrier for food items placed on said, upper surface;
   c. a top member having a lower surface made of a series of parallel ridges separated by parallel grooves wherein each of the parallel ridges has a rounded lower surface;
   d. said top designed to fit within said base so that the lower surface of said top member abuts against the upper surface of said base member so that any food item placed within said base member is compressed and ground by a grinding action between the top member and the base member; and
   e. each respective ridge of the base member is aligned with a respective ridge of a top member so that any food item placed between the lower surface of the top member and the upper surface of the base member can be coarsely ground.

8. A hand operated food grinding apparatus as defined in claim 7 further comprising a series of teeth on a portion of said base member.

9. A hand operated food grinding apparatus as defined in claim 7 wherein said wall has an opening to permit food to be slid off the base.

10. A hand operated food grinding apparatus comprising:
    a. a base member having an upper surface made of a series of parallel ridges separated by a series of parallel grooves wherein each of the parallel ridges has a flat upper surface;
    b. said base member having a wall on said upper surface to provide a barrier for food items placed on said upper surface;
    c. a top member having a lower surface made of a series of parallel ridges separated by parallel grooves wherein each of the parallel ridges has a rounded lower surface;

d. said top designed to fit within said base so that the lower surface of said top member abuts against the upper surface of said base member so that any food item placed within said base member is compressed and ground by a grinding action between the top member and the base member; and e. each respective ridge of the base member is offset from a respective ridge of a top member such that the ridges of the top member are respectively aligned with the grooves of the base member so that any food item placed between the top member and the base member can be finely ground.

11. A hand operated food grinding apparatus as defined in claim 10 further comprising a series of teeth on a portion of said base member.

12. A hand operated food grinding apparatus as defined in claim 10 wherein said wall has an opening to permit food to be slid off the base.

13. A hand operated food grinding apparatus comprising:

a. a base member having an upper surface made of a series of parallel ridges separated by a series of parallel grooves wherein each of the parallel ridges has an upper surface;

b. a top member having a lower surface made of a series of parallel ridges separated by parallel grooves wherein each of the parallel ridges has a lower surface;

c. said top designed to fit within said base so that the lower surface of said top member abuts against the upper surface of said base member so that any food item placed within said base member is compressed and ground by a grinding action between the top member and the base member; and d. each respective ridge of the base member is aligned with a respective ridge of a top member so that any food item placed between the lower surface of the top member and the upper surface of the base member can be coarsely ground.

14. A hand operated food grinding apparatus comprising:

a. a base member having an upper surface made of a series of parallel ridges separated by a series of parallel grooves wherein each of the parallel ridges has an upper surface;

b. a top member having a lower surface made of a series of parallel ridges separated by parallel grooves wherein each of the parallel ridges has a lower surface;

c. said top designed to fit within said base so that the lower surface of said top member abuts against the upper surface of said base member so that any food item placed within said base member is compressed and ground by a grinding action between the top member and the base member; and d. each respective ridge of the base member is offset from a respective ridge of a top member such that the ridges of the top member are respectively aligned with the grooves of the base member so that any food item placed between the top member and the base member can be finely ground.

15. A hand operated food grinding apparatus comprising:

a. a base member having an upper surface made of a series of parallel ridges separated by a series of parallel grooves wherein each of the parallel ridges has an upper surface;

b. a top member having a lower surface made of a series of parallel ridges separated by parallel grooves wherein each of the parallel ridges has a lower surface;

c. said top designed to fit within said base so that the lower surface of said top member abuts against the upper surface of said base member so that any food item placed within said base member is compressed and ground by a grinding action between the top member and the base member; and d. each respective ridge of the base member is aligned with a respective ridge of a top member so that any food item placed between the lower surface of the top member and the upper surface of the base member can be coarsely ground.

16. A hand operated food grinding apparatus comprising:

a. a base member having an upper surface made of a series of parallel ridges which are rounded in a concave fashion to be rounded into the base and are separated by a series of parallel concave grooves, wherein each of the parallel concave ridges has a flat surface; and b. a top member having a lower surface made of a series of parallel convex ridges separated by parallel convex grooves, wherein each of the parallel convex ridges has a flat surface, there being sufficient space along the upper surface of said base member to permit the convex ridges of the top to be either aligned with the concave ridges of the base or to permit the convex ridges of the top to be aligned with the concave grooves of the base;

c. whereby food items placed between the concave ridges of the base and the convex ridges of the top can be finely ground.

17. The hand operated food grinding apparatus as defined in claim 16, further comprising a hollow chamber within said top member to accommodate food items, and through which food items can be dispensed from an opening within said top.

18. A hand operated food grinding apparatus comprising:

a. a base member having an upper surface made of a series of parallel ridges which are rounded in a concave fashion to be rounded into the base and are separated by a series of parallel concave grooves, wherein each of the parallel concave ridges has a flat surface; and b. a top member having a lower rounded surface made of a series of parallel convex ridges separated by parallel convex grooves, wherein each of the parallel convex ridges has a rounded surface, there being sufficient space along the upper surface of said base member to permit the convex ridges of the top to be either aligned with the concave ridges of the base or to permit the convex ridges of the top to be aligned with the concave grooves of the base;

c. whereby food items placed between the concave ridges of the base and the convex ridges of the top can be finely ground.

19. The hand operated food grinding apparatus as defined in claim 18, further comprising a hollow chamber within said top member to accommodate food items, and through which food items can be dispensed from an opening within said top.

20. A hand operated food grinding apparatus comprising:

a. a base member having an upper surface made of a series of parallel ridges which are rounded in a concave fashion to be rounded into the base and are separated by a series of parallel concave grooves, wherein each of the parallel concave ridges has a grinding surface; and b. a top member having a lower surface made of a series of parallel convex ridges separated by parallel convex grooves, wherein each of the parallel convex ridges has a grinding surface, there being sufficient space along the upper surface of said base member to permit the convex ridges of the top to be either aligned with the concave ridges of the base or to permit the convex ridges of the top to be aligned with the concave grooves of the base;

c. whereby food items placed between the concave ridges of the base and the convex ridges of the top can be finely ground.

* * * * *